Oct. 15, 1968 B. A. PALM 3,406,073
DEODORIZATION OF HEATED LIQUIDS
Filed Nov. 24, 1964 2 Sheets-Sheet 1
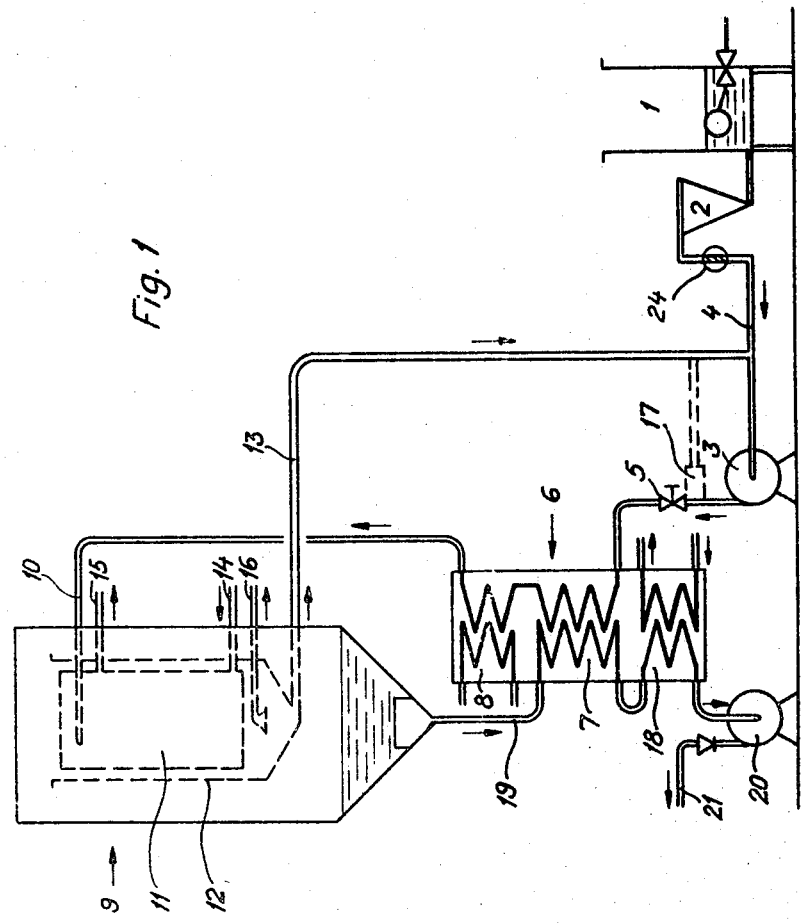
INVENTOR.
Bengt Arne Palm

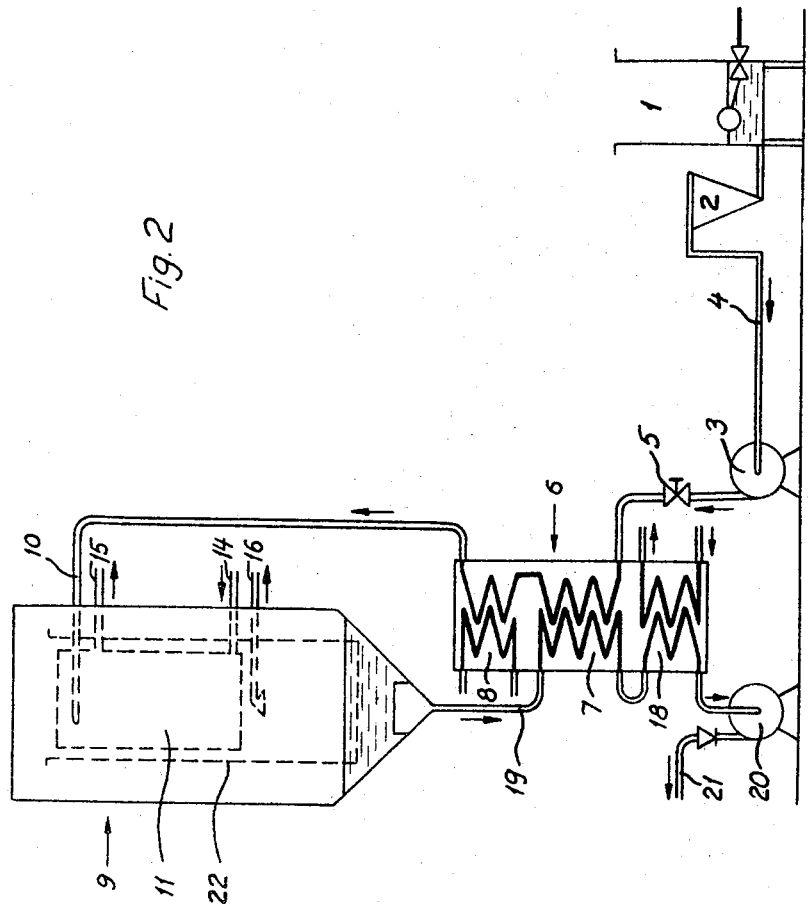

United States Patent Office 3,406,073
Patented Oct. 15, 1968

3,406,073
DEODORIZATION OF HEATED LIQUIDS
Bengt Arne Palm, Genarp, Sweden, assignor to Alfa-Laval A.B., Stockholm, Sweden, a corporation of Sweden
Filed Nov. 24, 1964, Ser. No. 413,576
Claims priority, application Sweden, Nov. 29, 1963, 13,241/63
8 Claims. (Cl. 99—61)

The present invention relates to a method and apparatus for deodorizing a heated liquid without modification of its concentration, the deodorization being carried out in one single stage in a deodorizing vessel subjected to vacuum. The invention is particularly well suited for the deodorization of milk, where it is required that the milk be discharged from the deodorizing operation with unaltered composition and concentration. However, the invention is also suited for the deodorization of other liquids.

For deodorizing milk, a two-stage deodorizing apparatus has hitherto been used, in which the milk is conveyed through two deodorizing vessels subjected to vacuum. Such prior apparatus includes a heat exchanger for obtaining different temperatures in the two vessels so that in the warmer vessel, where the milk is caused to boil, as large a quantity of water is removed from the milk as had been added to it in the first, cooler vessel, while evil-smelling gases are removed from the milk by means of a vacuum pump. In this way it was possible to obtain a deodorized milk with unaltered water-content and composition without the need to add fresh water to the milk.

In such deodorizing vessels large quantities of milk foam are generated, which foam is difficult to damp. Both vessels must therefore be quite oversized. Furthermore, they must be made of a corrosion-proof material, e.g. stainless steel, in order to avoid any unwanted taste in the milk. The vessels must also be of a sturdy design in order to resist the pressure difference between the internal pressure and the atmospheric pressure, and therefore their purchase price and space requirements are high.

An object of the present invention is to eliminate the drawbacks connected with the previously known method.

According to the invention, the deodorization is performed in one stage so that only one deodorizing vessel is required. The perviously-used first vessel has been replaced by a water-cooled, surface condenser, the size of which is much smaller than that of said previously-used deodorizing vessel. This offers the advantage that the surface condenser may be fitted inside the deodorizing vessel. Thus, the whole system is more compact and much cheaper, not only because one of the deodorizing vessels is eliminated, but also because a number of pipes and a pump are eliminated.

The invention is described more in detail below, reference being made to the attached drawings of which FIG. 1 is a schematic view of a preferred embodiment of a deodorizing plant and FIG. 2 is a similar view of a variant thereof.

The system comprises a delivery tank 1 and preferably a through-flow controller 2 in order to keep the rate at which milk is pumped by the pump 3 through the pipe 4 as constant as possible. The milk is pumped to a heat exchanger 6 by way of a control valve 5. In this heat exchanger the milk is conveyed through a regenerating section 7 and a heating section 8. The heated milk is thereafter conveyed to a deodorizing vessel 9 through a pipe 10 which preferably opens tangentially into the vessel 9, as described more in detail below. A surface condenser 11 is provided in the vessel 9, which condenser is surrounded by a jacket 12, the lower conical part of which is connected to a pipe 13 for the discharge of the condensate. The condenser 11 is double-walled and provided with an inlet 14 and an outlet 15 for the through-flow of a cooling medium. A suction pipe 16, which is connected to an exhaust pump (not shown on the drawing), opens into the space between the bottom of the condenser 11 and the jacket 12.

The condensate-pipe 13 opens into the pipe 4 ahead of the pump 3, so that the pump can suck condensate into the milk pipe 4. Alternatively, as shown in dash lines, the pipe 13 may open into the pressure side of the pump 3 by way of an injector 17.

From the bottom of the deodorizing vessel 9 the milk is conveyed through a pipe 19 to the regenerating section 7 of the heat exchanger 6 and therefrom to a cooling section 18 in the heat exchanger. The milk is thereafter pumped by means of a pump 20 and a pipe 21 to a storage tank or the like.

In the modified device according to FIG. 2, an elongated, cylindrical jacket 22 is fitted around the surface condenser 11. At its lower end the jacket opens below the liquid level in the deodorizing vessel. Condensate from the surface condenser is thus directly admitted into the liquid.

The device operates as follows:

The milk or other liquid is pumped by the pump 3 from the delivery tank 1 via the through-flow controller 2 through the heat exchanger 6, where the milk is first preheated by the milk discharged from the deodorizing vessel 9. It then flows through the steam-heated heating section 8, where the milk is heated to a temperature of about 75° C. From there the milk is conveyed via the pipe 10 into the vessel 9 through the tangential inlet and is thus caused to rotate in a comparatively thin layer around the wall of the deodorizing vessel toward the bottom of the vessel while water is partially evaporated, whereby evil-smelling gases are liberated. By means of the exhaust device 16, the vapor and the gases are drawn through the open upper end of the jacket (jacket 12 in FIG. 1 or jacket 22 in FIG. 2) and sucked downward through the space between condenser 11 and the surrounding jacket. Thus, the vapor condenses and drops to the bottom of the jacket, from which it is discharged through the pipe 13. Simultaneously, the gases are exhausted through the exhausting device 16.

As the condensate might absorb a part of the liberated gases, it may be desirable to reconvey it to a point ahead of the deodorizing vessel in order to deodorize the condensate as well. In order to avoid the need for a separate pump or a high water column in the down-pipe for the condensate, to ensure that the condensate gets mixed with the milk delivered, a throttling means 24 may be provided in the suction pipe to the milk delivery pump 3, the down-pipe 13 from the condenser being connected to the suction line downstream of the throttling means 24. A vacuum thus arises in the suction pipe, which together with the water column in the down-pipe from the condenser is sufficient to reconvey the condensate to the milk without providing a supplementary pump for that purpose. The throttling means may be constituted by the automatically operating output controller 2, since the system should be provided with such an apparatus in order to ensure a smooth operation and a constant water content in the milk The liquid level in the down-pipe from the condenser is preferably controlled by means of the control valve 5 in the milk pipe after the delivery pump 3. The liquid level in the down-pipe may be observed through a sight glass (not shown) fitted in the pipe. A certain, determined liquid level should be kept in the down-pipe 13 in order to obtain an even water content in the milk and to prevent the delivery pump from sucking air and thus causing an interruption or a reduced flow rate through the apparatus.

Owing to the fact that the milk flows along a spiral-shaped path on the inner wall of vessel 9, the foaming is damped and the central part of the vessel is thus free of foam. It is thus possible to arrange the condenser inside the deodorizing vessel as shown. It is, of course, also possible to arrange the condenser outside of the vessel, if required.

In the device according to FIG. 2, the condensate drops freely down into the processed milk at the bottom of the vessel, whereby the evaporated water is directly reconveyed to the milk. Owing to the fact that the jacket 22 dips into the milk at the bottom of the vessel, vapor and gas can be sucked through the surface condenser 11 only from the open upper part of the jacket and the condenser.

Since the condensate does not need deodorization in the device according to FIG. 2, the pipe 13 shown in FIG. 1 may open at a point in the milk discharge pipe from the vessel, preferably ahead of the pump 20 in order to achieve a suction of the condensate.

As it appears from the above description, several modifications are possible within the scope of the following claims.

I claim:
1. A method of deodorizing a heated liquid without changing its concentration, which comprises the steps of feeding the liquid to a vacuum chamber to generate vapors from the liquid while passing the unvaporized liquid to the bottom of said chamber, conveying said vapors through a surface condenser to form a condensate, and conveying said condensate, while apart from said chamber, to the liquid.

2. The method according to claim 1, in which the condensate is conveyed to said liquid being fed to the chamber.

3. The method according to claim 1, in which the liquid fed to said chamber is caused to rotate in a thin layer around the wall of said chamber.

4. Apparatus for deodorizing a liquid, which comprises a vessel forming a deodorizing chamber, means for maintaining a vacuum in said chamber, means for feeding the liquid in heated condition to said chamber, a surface condenser communicating with and located in said chamber to form a condensate of vapors generated in said chamber, and means separate from said vessel for returning said condensate to the liquid.

5. Apparatus according to claim 4, in which said return means include a jacket surrounding the surface condenser and open at the top.

6. Apparatus according to claim 4, in which said return means include a jacket surrounding the surface condenser and open at the top, said jacket being closed at the bottom, and a condensate discharge pipe leading from said closed bottom of the jacket.

7. Apparatus according to claim 4, in which said return means include a jacket surrounding the condenser and open at the top and bottom, said jacket extending downwardly from the condenser to a point below the level of unvaporized liquid in the chamber.

8. Apparatus according to claim 4, in which said return means include a jacket surrounding the condenser and open at the top, said vacuum means including a suction pipe opening into said jacket.

References Cited

UNITED STATES PATENTS

| | | | |
|---|---|---|---|
| 1,618,789 | 2/1927 | Todd | 99—249 |
| 2,428,044 | 9/1947 | Sharp et al. | 99—273 |
| 2,516,099 | 7/1950 | Board et al. | 99—249 |
| 3,101,041 | 8/1963 | Hallstrom | 99—251 |

ROBERT W. JENKINS, *Primary Examiner.*